Jan. 5, 1937.                W. M. McNEIL                2,066,846
            APPARATUS FOR MOLDING PLASTIC MATERIALS
                     Filed June 15, 1934          6 Sheets-Sheet 2

INVENTOR
WILLIAM M. McNEIL.
BY
ATTORNEY

Jan. 5, 1937.  W. M. McNEIL  2,066,846
APPARATUS FOR MOLDING PLASTIC MATERIALS
Filed June 15, 1934  6 Sheets-Sheet 3
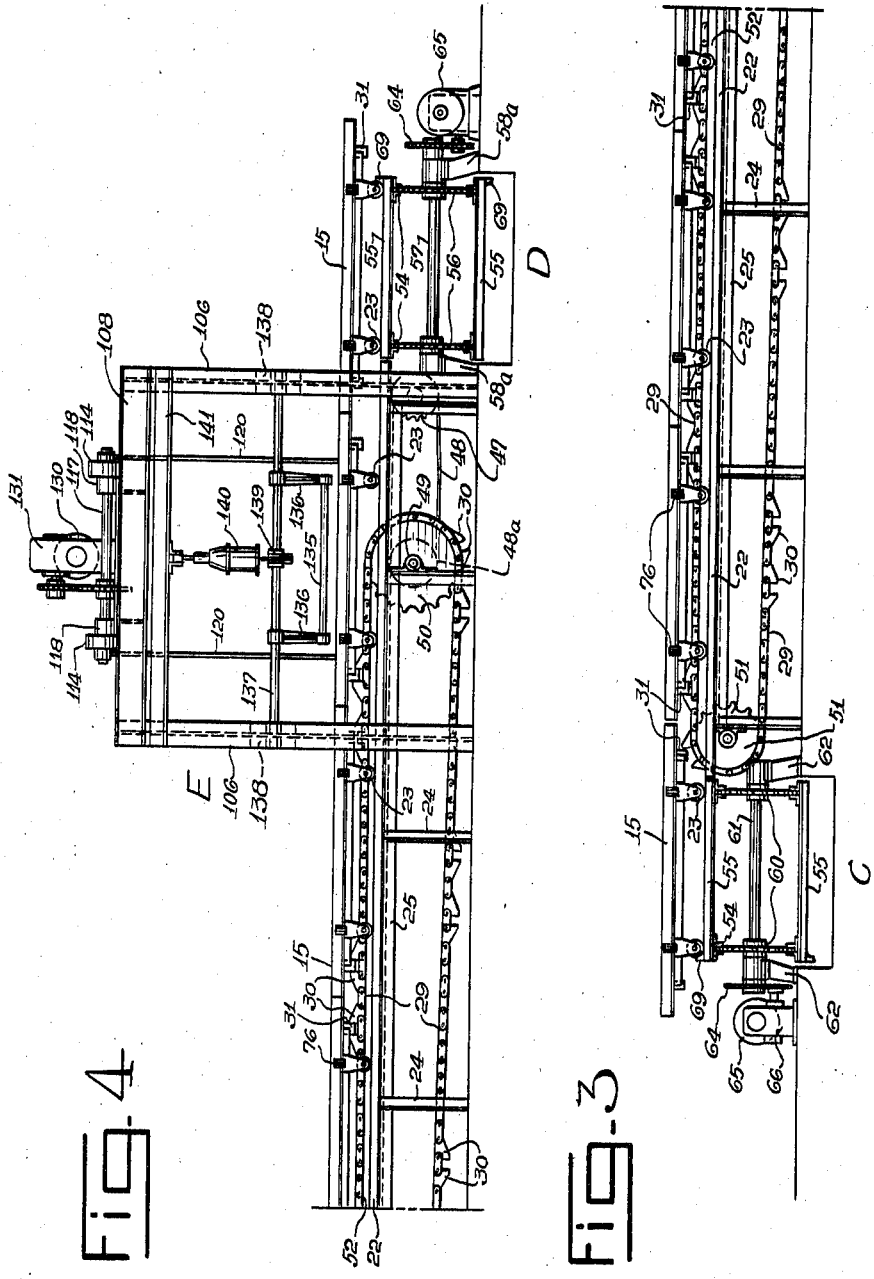
INVENTOR
WILLIAM M. McNEIL.
BY
ATTORNEY

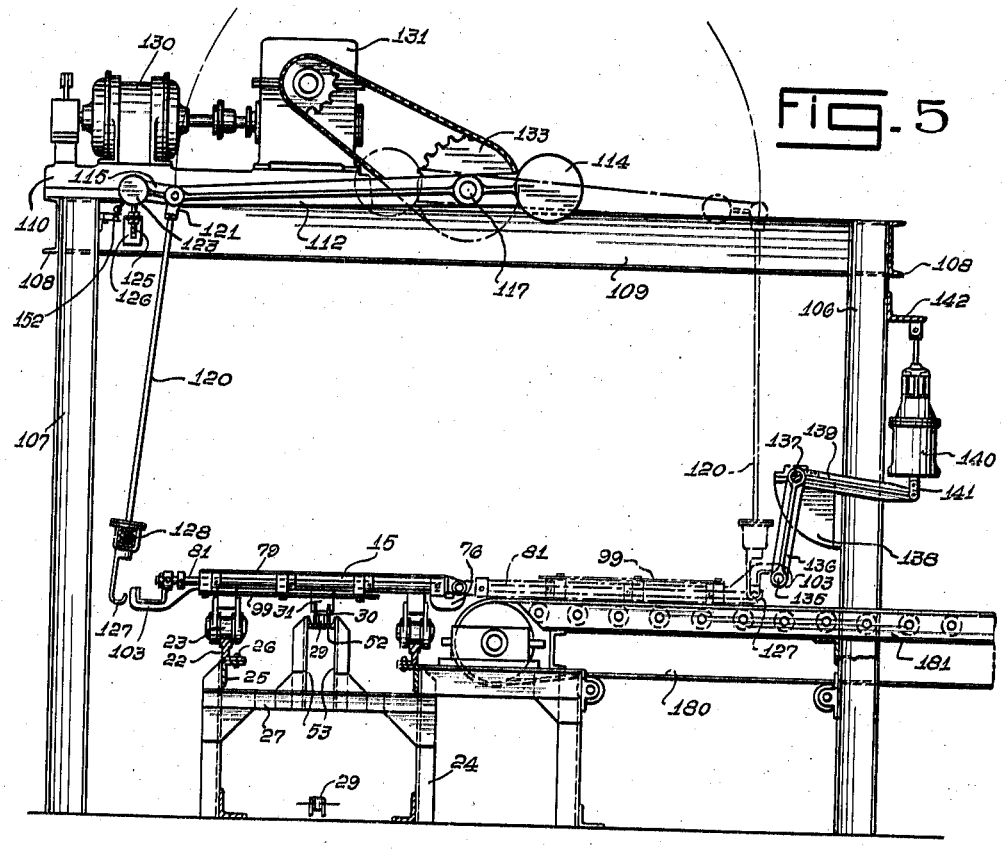

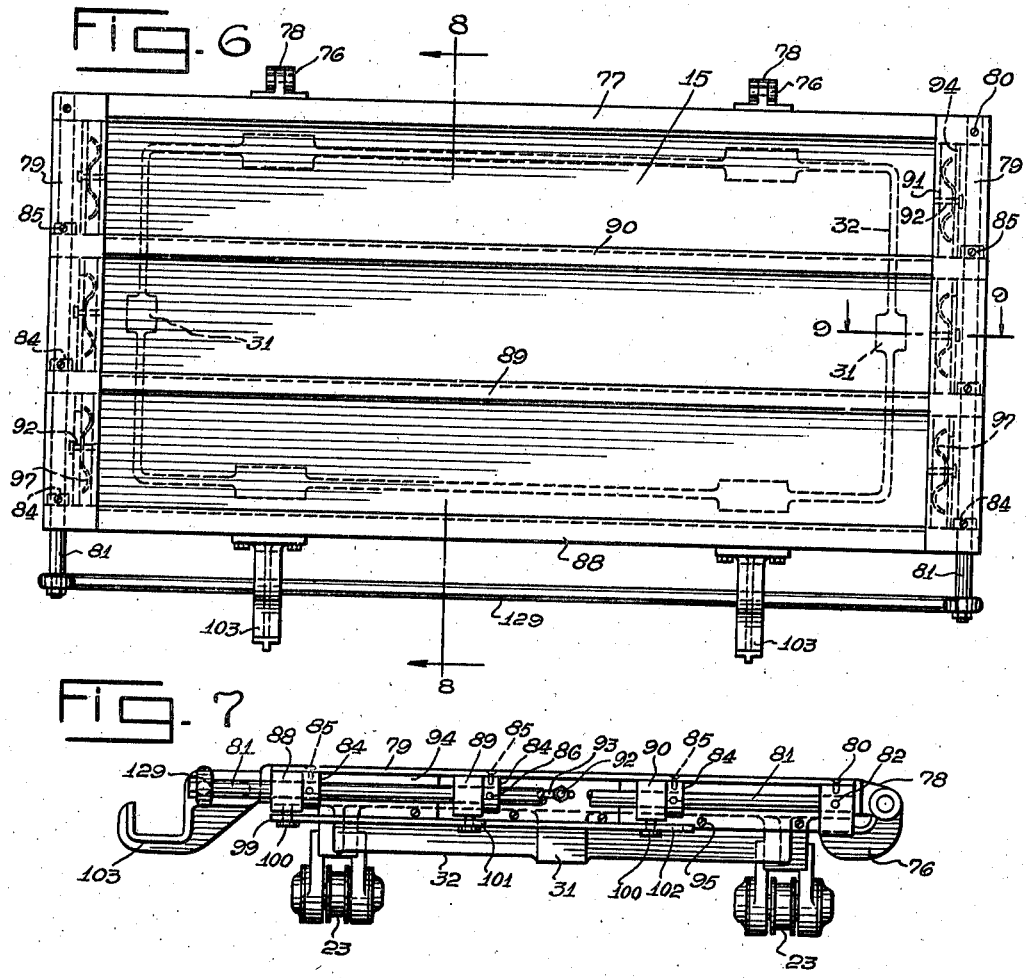

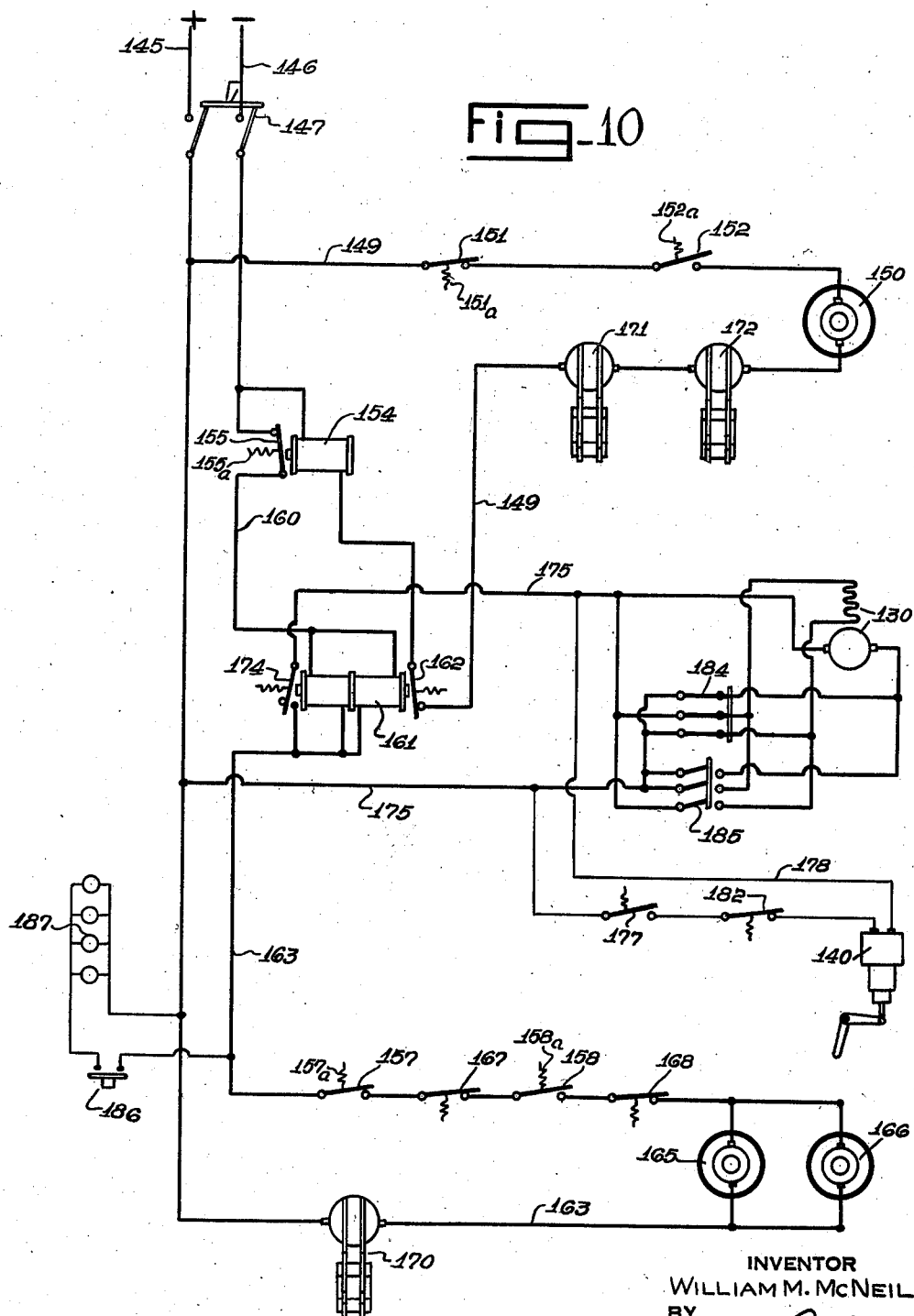

Patented Jan. 5, 1937

2,066,846

UNITED STATES PATENT OFFICE 2,066,846

APPARATUS FOR MOLDING PLASTIC MATERIALS

William M. McNeil, Warren, Ohio, assignor to United States Gypsum Company, Chicago, Ill., a corporation of Illinois Application June 15, 1934, Serial No. 730,687

16 Claims. (Cl. 25—2)

This invention relates to molding apparatus and more particularly has to do with apparatus for molding plastic materials into slabs or tiles such, for instance, as are finding extensive use in the construction of fireproof floors, roofs, ceilings and the like, and which it is desirable to manufacture in quantity for purposes of economy.

The type of slab to which the present invention is particularly applicable has generally been made in individual molds operated by hand, which has rendered this type of slab relatively expensive to manufacture, chiefly due to the labor cost and the slowness of production. In order to bring the precast type of construction into more wide spread favor, such construction must compete in cost with other types of construction heretofore employed for a similar purpose. Obviously, a construction of precast cementitious slabs requires less equipment such as forms, props, machinery, and like, on the job than where the cementitious materials are poured into place. Moreover, a precast construction adapts itself far more readily to rapid construction than where the structure is poured in place, and there is no delay due to the time necessary for setting and drying of the cementitious materials; nor is there any danger due to weather conditions such as freezing of the slabs at low temperatures or too rapid drying of the same at high temperatures, as the slabs are entirely cured at the mill before delivery to the job. Then also, with precast slabs a much more accurate control of materials as to uniformity of quality and aggregation is possible than where the materials are mixed at the point of erection. However, practically speaking, in every instance where precast slabs might have found ready application, cost has been the principal desideratum, and precast floors, roofs, etc., have heretofore been at somewhat of a disadvantage due to the initial cost of the slabs themselves, for reasons already outlined.

There have been numerous contributions to the art of molding relatively small, light-weight blocks and tiles such as are adapted particularly for wall and partition constructions or for superficial surfacing of structures. Such tiles or blocks are generally in relatively small units and present no substantial problems of reinforcing. However, where the slabs are to be used for roof or floor construction on which heavy loads must be sustained, and the slabs must consequently be designed to stand up under conditions of considerable strain, as by means of reinforcement and/or special construction, and for purposes of economy must be in relatively large units, problems of manufacture are encountered which are not present in the manufacture of other types of slabs.

It is, therefore, an object of the present invention to provide apparatus for the continuous, economical manufacture of slabs of plastic materials of the type employed for floors or roofs in building structures or the like.

Another object of the invention is to provide apparatus for molding plastic materials, which apparatus is coordinated in operation and which may be constructed so as to be practically automatic in performance.

It is another object of the invention to provide an apparatus in which there is a mold particularly suitable for casting relatively large slabs of plastic materials, which lends itself readily to reinforcing the slabs and which is adaptable for manufacturing a plurality of slabs at one time.

Another object of the invention is to provide novel means for stripping the molds and discharging the slabs therefrom.

Another object of the invention is to provide a molding apparatus which is constructed in the form of a substantially closed circuit, wherein all the elements are utilized to the fullest extent and the rate of production per unit of area of floor space occupied by the apparatus will be as high as possible.

A further object of the invention is to provide apparatus for molding plastic materials into slabs suitable for building constructions or like purposes which will necessitate a minimum of floor space area, which is simple in construction and automatic in operation, which will require a minimum of attention in operation, and which is efficient and economical for the purpose intended; also to improve apparatus for molding in other respects which will hereinafter more fully appear from the specification and the appended claims.

Reference is to be had to the accompanying drawings, forming a part of this specification, in which:

Fig. 3 is a side elevation of substantially that part of the molding apparatus illustrated in Fig. 1;

Fig. 4 is a side elevation of substantially that part of the molding apparatus illustrated in Fig. 2;

Fig. 5 is a sectional elevation taken on line 5—5 of Fig. 2;

Fig. 6 is a plan view of an improved mold embodying the principles of the invention;

Fig. 7 is an end elevation of the mold;

Fig. 8 is a sectional elevation taken on line 8—8 of Fig. 6;

Fig. 9 is a fragmentary sectional elevation taken on line 9—9 of Fig. 6; and

Fig. 10 is an electrical wiring diagram illustrating a manner of accomplishing automatic operation and control of the apparatus.

Figure 1:
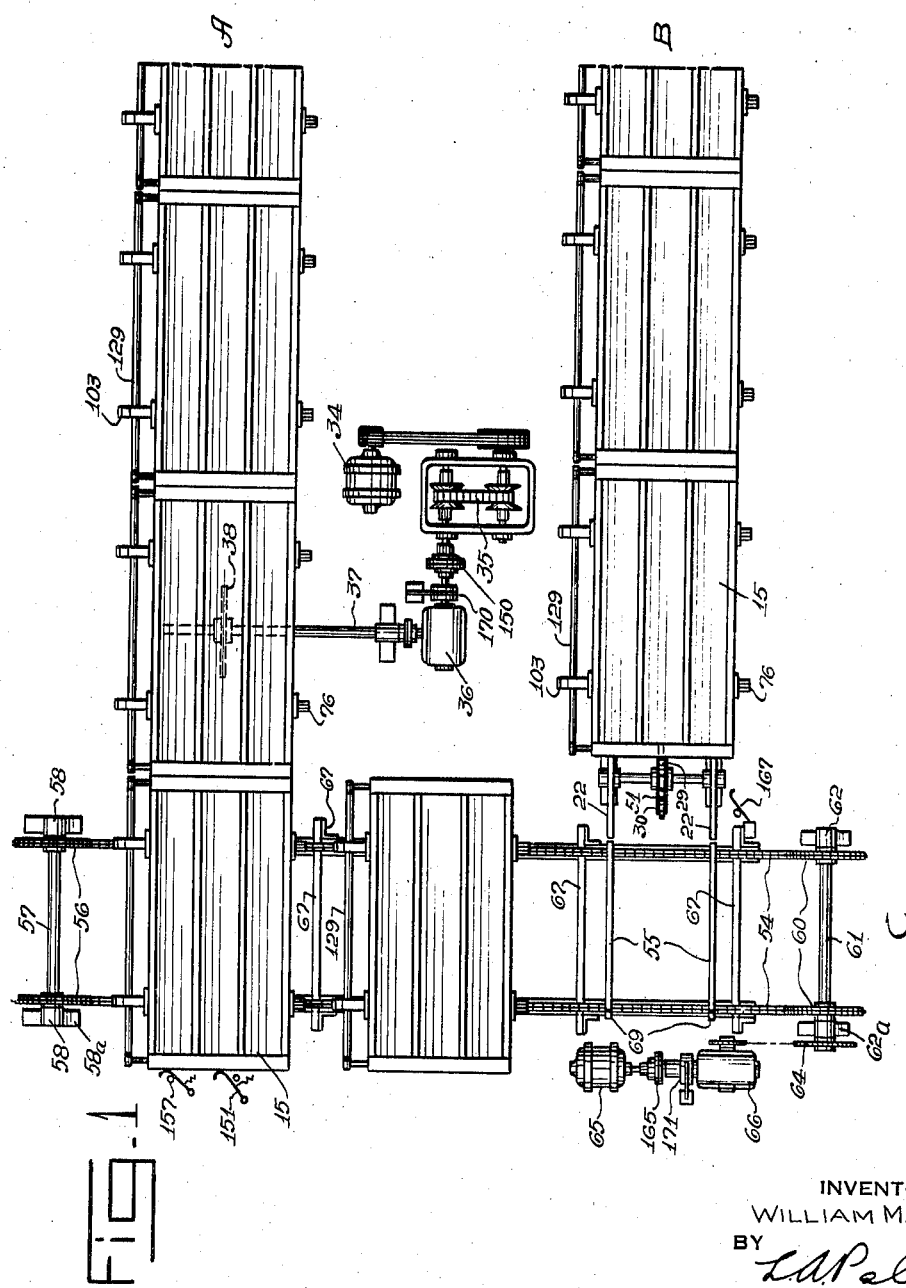
Fig. 1 is a plan view of one section of an apparatus embodying the principles of my present invention.

The apparatus preferably comprises a plurality of slab molds, means for guiding the molds about a closed molding circuit, means for filling or loading the molds at one point in the circuit, and means at another point in the circuit for discharging the formed slabs from the molds. To this end there are provided, in the present embodiment of the invention, a plurality of molds 15, a source of supply 20 for plastic materials; suitable framework means comprising sections A and B over which the molds are moved; suitable means, such as conveyors C and D for transferring the molds from one framework section to another; and suitable means, such as the ejecting or stripping assembly E, for dumping the molds and discharging the formed slabs.

The framework, which may be of any construction suitable under the circumstances, is preferably adapted to support track means or the like 22 over which the molds are adapted to be drawn, suitable means such as rollers 23 being provided on the bottoms of the molds for engagement with the tracks 22.

The framework sections A and B preferably comprise uprights 24; longitudinal members 25 to which the tracks 22 are suitably secured, as by means of bolts 26; and transverse members 27. The framework sections A and B are preferably suitably spaced apart in parallel relationship, and for purposes of simplicity and standardization each section should preferably be of similar construction in essential particulars. In order to impel the molds 15 over the tracks 22, suitable actuating means are provided. These actuating means preferably comprise endless chains 29 provided with engagement lugs 30 adapted to engage with lugs 31 on ribs 32 of the under-frame of the molds 15. Suitable means, such as an electric motor 34 (see Fig. 1), operating through control means such as a variable speed transmission 35 and speed reducing means 36, are associated with the means for actuating the molds and act to rotate drive shaft 37, which is suitably journaled at one end of the framework section A of the machine and upon which is secured driving sprocket 38 over which actuating chain 29 runs. An idler sprocket 39, which the chain 29 engages at the opposite end of the framework A, is carried on shaft 40 which is suitably journaled in brackets 41. Inasmuch as it is desirable, as will be more fully explained hereinafter, to have all the molds 15, carried on both sections A and B of the machine, actuated simultaneously, a bevelled gear 43 is provided on the inner end of shaft 40, this gear 43 being adapted to mesh with an intermediate bevelled gear 44 meshing with and driving in a counter direction bevelled gear 45 attached to a shaft 46. A sprocket 47 on shaft 46 preferably engages a chain 48 which engages a sprocket, not shown, attached to a shaft 49 on which is secured driving sprocket 50 over which the driving chain 29 associated with framework section B is engaged.

It is thus apparent that when the driving means is set in operation, the molds on the portion A of the machine will be actuated in one direction and the molds on the section B will be actuated in the opposite direction while the impelling force is supplied by one source of power. An idler sprocket 51, adapted to be engaged by chain 29, is provided at that end of the framework section B adjacent to the transfer means C. In order to prevent sagging of the chains 29 intermediate the driving and idler sprockets, and consequent disengagement of the engagement lugs 30 from the lugs 31 on the molds 15, suitable means, such as channels 52, supported by suitable standards 53 on the members 27, are preferably provided to support the chains under the molds.

The transfer conveyor C is adapted to shift the molds 15 from section A to section B, and transfer conveyor D similarly shifts the molds back from section B to section A. Since each conveyor is preferably substantially a duplicate of the other, a description of one will suffice for the other. The conveyors preferably comprise a pair of endless chains 54 to which there are suitably secured pairs of bars or track extensions 55 to receive the rollers 23 of the molds 15. The chains 54 at one end run over suitable idler sprockets 56 on shaft 57 journaled in bearings 58 carried by brackets 58a, and at the other end of the conveyors these chains run over sprockets 60 carried on shaft 61 journaled in bearings 62 carried by brackets 62a. A sprocket 64 secured to the end of shaft 61, is driven from a suitable source of power such as a motor 65, operating through speed reducing mechanism 66, to actuate the conveyors and carry a mold 15 from one section of the machine to the other. Suitable means, such as framework 67, is preferably provided to support the chains 54 for the distance over which the chains must support the molds 15 in transferring the same. Track extensions 55 are arranged so as to align with the tracks 22 of sections A and B, and are provided with stops 69 at their outer ends to limit the travel of the molds thereon.

Figure 2:
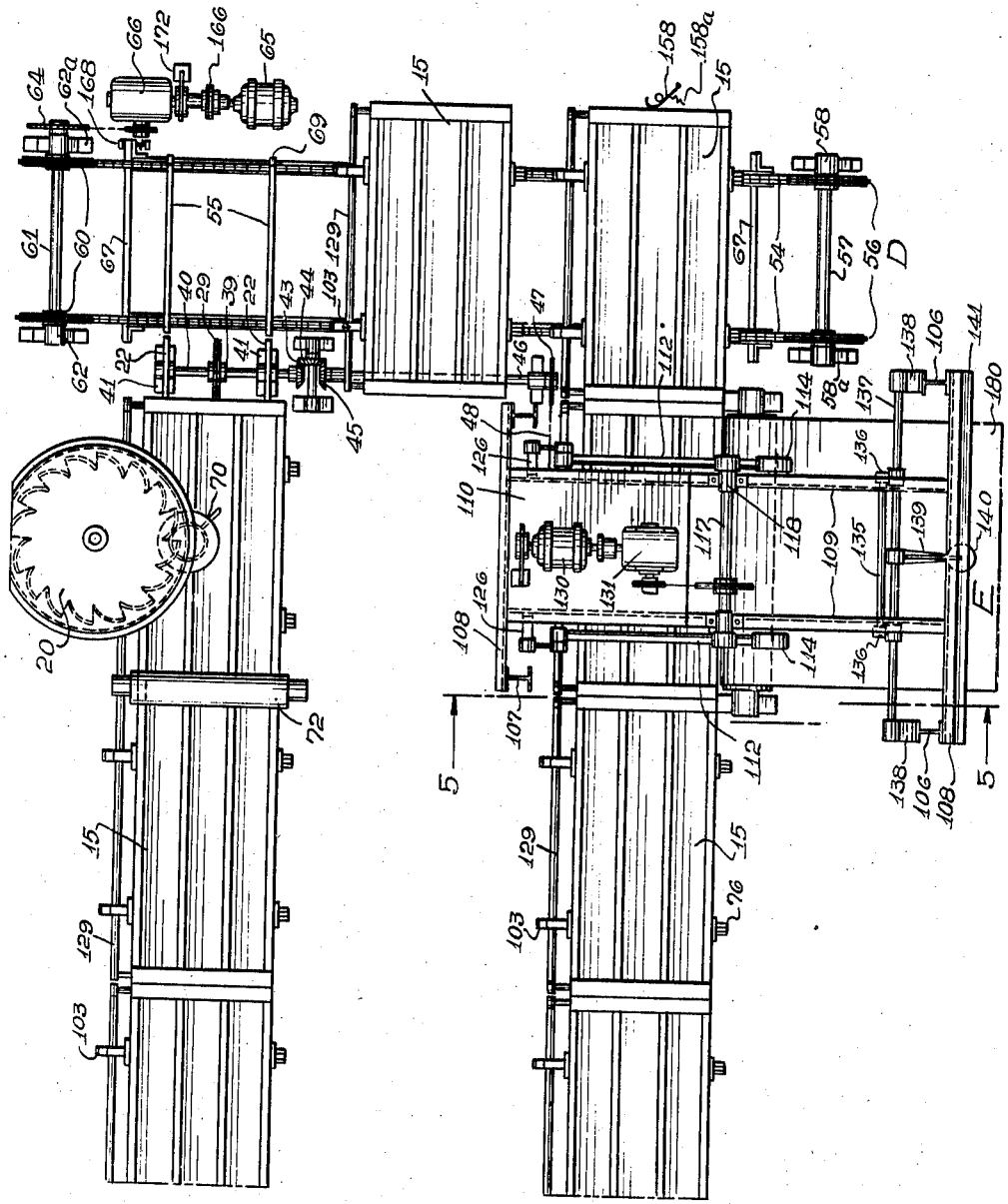
Fig. 2 is a continuation of Fig. 1 and is a plan view of the remaining section of the apparatus.

The filling or loading means 20 (Fig. 2) may be of any desirable type, but is illustrated as a conventional spindle mixer provided with suitable gate means 70 for flowing the plastic material, such as gypsum slurry, cement, or the like, to the molds as the same come thereunder. Any desired leveling means, such, for example, as roller 72 journaled in suitable bearings, not shown, may be positioned in the path of the molds so as to smooth off the slab-forming cementitious material level with the tops of the molds. The loading means 20 and the leveling means 72 are preferably situated adjacent the starting end of section A, that is, the end at which the transfer conveyor D delivers the molds 15 for the beginning of their travel over the section A. In this manner the plastic material is permitted to set and harden throughout the travel of the molds over section A, during travel on conveyor C to section B and during travel over section B to the ejecting mechanism E.

The molds 15 are preferably constructed in such a manner as to facilitate discharge of the formed objects. Means are therefore provided which are adapted to be engaged by the ejecting or stripper mechanism so that at least a portion of the molds may be inverted and opened to eject the formed objects therefrom. To this end there is preferably hingedly connected to the bottom or base 75 of the molds, as by means of hinges 76, a slab forming device which preferably comprises a side 77 which is pivotally connected with the hinge 76 by means of ears 78. End frame members 79 are preferably rigidly secured to the ends of side 77 by any suitable means, such as screws 80; and slide bars or rods 81 are journaled or threaded in the ends of the sides 77 under the frame members 79 and retained against displacement by means of pins 82, or the like. The bars 81 are held in rigid alignment under frame members 79 by means of spaced collars 84, secured to the members 79 by means of screws 85 and to the bars 81 by means of set screws or pins 86. Side bar 88 and divider or partition bars 89 and 90 are preferably slidably associated with the bars 81, suitable apertures being provided in the end of the side bar 88 and the partition bars 89 and 90 through which the bars 81 are adapted to pass.

Retaining means for the plastic material are provided adjacent the ends of the molds. These means are preferably so constructed as to allow for some expansion of the plastic material in setting and preferably comprise slidable plates 91 having headed bolts 92 threadedly secured therein at about the center of the back thereof. These bolts are slidable in slots 93 provided in panels 94 which are attached by means of screws 95 to depending flanges 96 formed on the base 75. Panels 94 are so positioned as to allow sufficient clearance between the ends for a substantial sliding movement of the partitions 89 and 90 along the bars 81 for ejection purposes which will more fully appear hereinafter.

Leaf springs 97 serve to keep the slidable plates 91 positively spaced from the panels 94 but allow for compression upon expansion of the plastic material. Links 99 are provided to connect side bar 88 and partition bars 89 and 90 together, cap screws 100 serving to attach the links adjacent the ends of said side and partition bars. Slots 101 of predetermined lengths are provided in the links 99 to provide slidable clearance for the screws 100 which are in the ends of the partition bar 89, and slots 102 are similarly provided for the screws positioned in the ends of the partitions 90. The slots 102 are preferably somewhat longer than the slots 101 so that when the side 88 is drawn away from the mold along the rods or bars 81, as by engagement of hooks 103 attached to the side 88, there will be a predetermined interval before the shanks of screws 100 in the partition 89 are engaged by the links 99 to move this partition, and there will be a somewhat longer interval before partition 90 is similarly moved. The primary purpose in having the side 88 and partitions 89 and 90 move apart relative one to the other and the side 77 is to effect removal of the formed slabs by breaking the seal between the set cementitious material and the parts of the mold to release the slabs.

It is apparent that the stripping clearance that must be allowed between the sides and partitions of the mold will be largely governed by the contours of the edges it is desired to mold on the slabs. For example, in the illustrated form of molds there are represented tongue-forming grooves 104 intermediate the upper and lower faces of the side bar 88 and the partition bars 89 and 90, and complementary groove-forming projections 105 on the side bar 77 and on the opposite sides of the partition bars 89 and 90.

These slab side-shaping expedients may, of course, be of any desired cross section and in any desired position on either side of the partition bars 89 and 90 and on the inner faces of the side bars 77 and 88, but it is apparent that in releasing the formed slabs from the molds it will be necessary to draw the side and partition bars sufficiently apart to completely release the slab or slabs from the mold.

The means E for inverting the molds and effecting the stripping thereof may comprise a framework of standard structural members comprising a pair of standards 106 on one side of the path of travel of the molds 15, a pair of standards 107 on the opposite side, header members 108, and a pair of beams 109 supported at their ends by the headers 108 and providing support for a suitable motor base platform 110. A pair of lever arms 112, provided with suitable counterweights 114 at one end and pivotally supporting bell crank levers 115 at the other end, are mounted on the ends of a rock shaft 117 which is rotatably mounted in bearings 118 supported on the members 109. Links 120 are secured to depending arms 121 of the bell crank levers 115, and counterweights 123 on the other arm of each bell crank lever are adapted to rest upon adjustable stops 125 carried by brackets 126 which may be secured to the webs of beams 109. Means are provided on the links 120 for engaging with the molds 15 when the same are to be stripped. These means preferably comprise hooks 127 resiliently connected with the links 120 by means of spring shock absorbers 128, the hooks 127 being adapted to hook under engagement bar 129 which is suitably connected to the ends of slide bars 81 of a mold 15.

A suitable source of power, such as a shunt motor 130, which operates through speed reducing mechanism 131, is provided to actuate sprocket 133 and thereby shaft 117 to which are secured the lever arms 112. Suitable control means are adapted to set the motor 130 into operation to actuate the lever arms 112 upwardly through an arc of substantially 180 degrees to carry the links 120 from the full line position to the dot and dash position shown in Fig. 5. As the arms 112 begin their upward movement, the counterweights 123 drop downwardly due to gravity and consequently urge the arms 121 of the bell crank levers 115 counter-clockwise, as seen in Fig. 5, to carry the links 120 and hooks 127 in a counter-clockwise direction whereby the hooks 127 engage the bar 129 of a mold. Thus the upper, hingedly connected portion of the mold is carried over to the dot and dash position as the links 120 are carried over by the arms 112.

Means are preferably provided to engage the hooks 103 of a mold, after the hinged portion has been carried to the dot and dash position shown in Fig. 5, to pull the side bar 88 in a direction away from the mold to complete the stripping of the mold and release the slab or slabs therefrom. Where the mold is of the plural slab type, as illustrated, the slotted links 99 will, upon movement of side 88, function also to draw partitions 89 and 90 progressively apart and effect the release of all the slabs. The means for engaging hooks 103 preferably comprises a bar 135 supported at its ends by levers 136 which are rigidly connected to bar 137, said bar being suitably journaled on brackets 138 carried by standards 106. A lever 139 is rigidly connected to bar 137, preferably at a point intermediate the levers 136, and is connected to suitable actuating means, such as a hydraulic operator 140, by means of link 141. The actuating means 140 may be suspended from the header 108 connecting the standards 106, or a separate angle bar 142 may be provided to support the same. As soon as hooks 103 of a mold side engage bar 135, operator 140 is actuated to draw lever 139 upwardly, thus imparting a counter-clockwise motion to the bar 137, the levers 136 and bar 135 and thereby drawing the side bar 88 of the mold in a direction away from the mold to effect release of the slab or slabs from the mold. The actuating means 140 becomes inoperative immediately upon reaching its up stroke and then sinks back to starting position by the force of gravity.

After the slabs have been released from the mold, the lever arms 112 are moved back to initial position and serve to carry the hinged upper portion of the mold back to again rest on the base portion 75. While being carried back, the side 88 and partitions or dividers 89 and 90 drop back by force of gravity to the spaced position on the rods 81 defined by the collars 84 so that the molds will again be ready for filling. This operation I call constricting the mold.

The molding circuit of the present invention is preferably carried on in a continuous, synchronized, automatic sequence, with all the elements cooperating in timed relationship. To this end the apparatus may be considered as a plurality of cooperating and dependent units, the sections A and B, and the means for actuating the same, may be considered as one unit, the conveyors C and D as another unit and the stripper assembly E as still another. Means are therefore provided whereby, while the molds 15 are being actuated over sections A and B, the transfer conveyors C and D and the stripper E are inoperative, but as soon as molds have been delivered from the sections A and B to conveyors C and D, respectively, then the means for actuating the drive chains 29 will be rendered inoperative and the means for actuating the conveyors C and D and stripper E will become operative through their period in the preferred continuous and progressive cycle of operation, whereafter the actuating means for the sections A and B again become operative, and so on in continuous sequence. All this may be performed by a mechanical system functioning from a central source of power through a series of pulleys or chain drives and suitable clutches, levers, trippers, etc. However, I prefer to employ an electrically controlled system as I find that it provides a more simple and a more readily controllable set-up, particularly where variations may occur from time to time in the interval required for setting of the cementitious materials employed for molding. As illustrated, the control system comprises a series of switches, relays and magnetic clutches, but it is to be understood that a system including solenoids and so-called "one revolution clutches", or the like, may be used for the purpose so long as the arrangement is of a nature to permit the successive operations to follow each other in a certain sequence with a cycle speed determined by the setting of the variable transmission 35.

Referring to Fig. 10, direct current electric trunk lines 145 and 146 are provided with a suitable double pole switch 147, the closing of which permits energization of the electrical circuit and starts operation of the apparatus. Line 149 runs from trunk 145 and is adapted to energize a magnetic clutch 150 so as to transmit the power from motor 34 through reducing gear means 36 and shaft 37 to sprocket 38 to set into motion chains 29 of sections A and B and move the molds 15 toward the transfer conveyors C and D, respectively. Switch 151, normally held closed by a spring 151a, is adapted to be opened upon contact of the end of a mold 15 which has reached its limit of travel on the bars 55 of transfer conveyor C, as shown in Fig. 1. Switch 152, which is normally held open by a spring 152a, is preferably associated with a bracket 126 of the stripper assembly E and is kept closed until lever arm 112 is raised and a counterweight 123 is lifted from said switch. While current flows through line 149, series relay 154 holds open switch 155 which is normally held closed by a spring 155a and prevents current from energizing the transfer conveyor circuit or the stripper circuit.

Simultaneously with the opening of switch 151, switches 157 and 158, which are normally held open by springs 157a and 158a, respectively, are actuated by the molds which have come from the sections A and B onto the conveyors C and D, respectively. The opening of switch 151 breaks the circuit through line 149 and de-energizes relay 154, thus releasing switch 155 and closing the circuit through line 160 leading to double relay 161 which becomes electrically energized and thereby opens safety switch 162 to prevent any accidental closing of the circuit through line 149 until transfer of the molds and stripping is completed. The circuit is closed through line 163 to energize magnetic clutches 165 and 166 and set into operation conveyors C and D to shift the molds thereon over to the next position. Switches 157 and 158 may be timed or solenoid operated to remain closed until normally closed switches 167 and 168 are opened by contact of the sides of the molds being transferred by conveyors C and D, respectively, after the molds have travelled a sufficient distance so that bars 55 carrying a mold on each conveyor have aligned with tracks 22 so that the molds are in position to be drawn off the conveyors by engagement of chain-lugs 30 with lugs 31 on ribs 32 below the base 75 of the molds. A solenoid brake 170 is energized simultaneously with closing of the circuit through line 163 to promptly halt all movement of shaft 37; and solenoid brakes 171 and 172 are similarly energized to halt all further movement of conveyors C and D immediately upon closing of the circuit through line 149, whereby coasting of the relatively heavy molds is prevented and perfect alignment of the elements of the apparatus is maintained.

When double relay 161 is energized, normally open switch 174 is closed to close the circuit through line 175 thus energizing and setting into operation shunt motor 130 to rotate sprocket 133 in a clockwise direction as viewed in Fig. 5 and carry arms 112 upwardly, whereby hooks 127 on links 120 engage the bar 129 of a mold 15 and carry the hinged section of the mold over so that hooks 103 will engage with bar 135. The completely inverted hinged portion of the mold closes normally open switch 177 thus closing an electric circuit through line 178 to energize hydraulic operator 140 which rocks levers 136 and 139 and bars 135 and 137 in a counter-clockwise direction as viewed in Fig. 5, thus translating the hooks 103 to the right to open the inverted mold section in a manner heretofore described to release the molded slab or slabs therefrom and deposit the same on a belt conveyor 180 the upper reach of which is supported by a roller section 181 so as to carry the slabs to any desired point for disposition. The completion of the up stroke of the hydraulic operator 140 opens normally closed switch 182 thereby opening the circuit through line 178 and allowing the operator to assume starting position through force of gravity.

Three pole, single throw switch 184 is normally closed so that when the electric circuit is closed through line 175, shunt motor 130 will actuate the arms 112 in a clockwise manner as described. When the hydraulic operator 140 completes its upward stroke, three pole, single throw, normally open switch 185 is closed, and switch 184, which is preferably mechanically tied to switch 185, is opened and held open for a predetermined interval by means of a suitable latch or the like. This reverses the current through shunt motor 130 and the direction of rotation of the same whereby to carry arms 112 in counter-clockwise direction to again carry the hinged section of the mold back into place on the mold base 75. In order to insure that the stripper circuit is kept closed until stripping is completed, there is preferably provided a switch 186 which is normally closed but is held in open position while the arm 112 is in the full line position shown in Fig. 5. This switch closes immediately upon raising of the arms 112 and cuts in a lamp bank 187 so that even while the stripper motor 130 is momentarily idle before switch 185 reverses the direction of rotation of said motor, or the switches 167 and 168 are opened before switch 152 is closed, the stripper circuit will remain energized.

Switches 167, 168, 186 and 177 are opened, and switch 152 is closed by the completion of the transfer of the molds by the conveyors and by the completion of the stripping operation, and the circuit through line 149 is again closed so that the chain drive is set into operation to repeat the described operations. Emergency cutout switches for halting operation of the apparatus at any time in the sequence of its functions as desired may be positioned at strategic points to meet operating requirements.

In operation, the molds 15 are successively filled with cementitious material from the mixer 20 and may then be levelled off by the levelling means 72 as the molds are actuated thereunder. The molds are then successively delivered from machine section A to the transverse conveyor C and from conveyor C to machine section B. As each succeeding mold reaches a position directly under stripper mechanism E and adjacent conveyor 180, the stripper is operated as heretofore described to invert the molds and strip the same to permit the slabs to be carried off by the conveyor. After the stripping operation, the molds 15 are delivered to the transverse conveyor section D and returned to the mixer 20 on machine section A to recommence the molding cycle. Metallic reinforcement in any desired form, such for example as metallic mats, cages, or the like, may be inserted in the molds while the same are on conveyor D prior to being returned to the track of section A where the molds are refilled with cementitious material.

Inasmuch as variations will occur in the setting time of the molding compositions which it may be desirous to employ from time to time, the variable transmission 35 will be found particularly advantageous for accurately gauging the speed of the machine relative to the setting time. The cementitious material will, of course, be allowed a setting time in the molds equivalent to the time of travel of the molds 15 through the given stages of operation of the apparatus, from the point at which they are filled from the mixer 20 throughout travel over section A to conveyor C, while being transferred from conveyor C to section B, and during travel over section B to the stripper mechanism E. Since movement of the molds, in the preferred embodiment of the invention, controls the sequence of operation of the various correlated electrical or mechanical circuits of the apparatus, it is obvious that by reducing or accelerating the speed at which the molds are made to travel over the various sections of the apparatus from loading to stripping, the time that any given mold will take to travel around the circuit, and consequently, the time during which the cementitious material forming the slab is allowed to remain in the mold, may be accurately controlled. Thus, I have provided an improved method and apparatus for continuously and synchronously molding cementitious materials, such as gypsum, cement, or the like, into relatively large slabs, and these may be, for example, about 6 ft. in length and 1 ft. or more in width, and it is within the scope of the invention to form a plurality of slabs at one filling of a mold.

By employing an electrical hook-up, such as is diagrammatically illustrated in Fig. 10, and hereinbefore described in detail, automatic operation of the molding apparatus is secured. For example, when the apparatus is in the position shown in Figs. 1 and 2 to start, then at the time switch 147 is closed, it will be seen that since switch 151 is open by reason of contact of a mold 15 thereagainst, and switches 157 and 158 are closed, the electrical current will immediately energize line 163 and the associated circuits operating through lines 175 and 178. Thus magnetic clutches 165 and 166 are energized to transmit the power from motors 65 to actuate the conveyors C and D to shift the molds next in order into position opposite machine sections B and A, respectively. By energizing of relay 161, switch 174 will be closed, to cause operation of motor 130 and thereby set into motion the stripper arms 112 and carry the same through the stripping cycle.

After the molds have been brought into position ready to be drawn back upon the sections A and B, respectively, switches 167 and 168 will be opened, and if the stripper arms 112 have not been returned to the full line position shown in Fig. 5, lamp bank 187, which is cut into the line 163 immediately upon raising of the arm 112 and closing of switch 186, acts to keep that much of line 163 energized as is necessary to keep the relay 161 activated so that current will be kept flowing through line 175 until the stripper arms have been returned. Thereupon, switch 186 is opened, switch 152 is closed, and relay 161 is deenergized, so that current will again flow through line 149 to energize magnetic clutch 150, to set into operation drive shaft 37 and associated sprocket 38, to actuate chain 29, and cause movement of the molds 15 over machine sections A and B, as hereinbefore described. Each separate operation of the individual units of the apparatus is preferably dependent upon the completion of the preceding operation, and regardless of where operation of the apparatus may be halted, operation from that point on without interruption will be again resumed upon cutting in the electrical current.

I will state in conclusion, that while the illustrated examples constitute a practical embodiment of my invention, I do not wish to limit myself precisely to these details, since manifestly, the same may be considerably varied without departing from the spirit of the invention as defined in the appended claims.

Having thus described my invention, I claim as new and desire to secure by Letters Patent:

1. In apparatus of the class described, a travelling slab mold having a hingedly connected portion, means for inverting said mold, and means for halting said mold adjacent said inverting means, said inverting means comprising means for engaging a side of said mold, and means for actuating said engaging means to carry said engaged side of the mold through an arc of substantially 180° to eject a slab from the same.

2. In apparatus of the class described, means for stripping a mold, said means comprising a lever arm, a link connected to said lever arm, means connected with said link for engaging the side of the mold, means for actuating said stripping means to invert the mold and then bring the same back to initial position, and other means for engaging the side of the mold to separate the same and release the formed slab.

3. In apparatus of the class described, a slab mold, said mold comprising a base, means on said base whereby said mold may be readily shifted over track means, slab forming means hingedly connected to said base, means for separating said last mentioned means to release and eject the formed slab, and means connected with said base to provide engagement with means for actuating said mold over said track means.

4. In apparatus of the class described, a movable mold, comprising a base, sides on said base, one of said sides being hingedly connected to said base and the remaining sides being connected to said hingedly connected side, the side opposite said hingedly connected side being movable away from said hingedly connected side, a plurality of movable partitions between said last mentioned sides, and a slotted link connecting said partitions and said movable side, the slots in said link being of graduated lengths so that each of said partitions will be moved somewhat less than said movable side upon movement of said movable side.

5. In apparatus of the class described, a pair of parallel track means spaced apart, a mold adapted to travel over said track means, driven means for actuating said mold in opposite directions on each of said track means, means comprising a transfer conveyor with track extensions for the reception of said mold to shift the same from one track to the other track, and means associated with said conveyor and operated by said mold to actuate said conveyor and stop the operation of said driven actuating means.

6. In apparatus of the class described, a pair of parallel track means spaced apart, a mold adapted to travel over said track means, driven means for actuating said mold in opposite directions on each of said track means, means comprising a transfer conveyor with track extensions for the reception of said mold to shift the same from one track to the other track, means associated with said conveyor and operated by said mold to actuate said conveyor and stop the operation of said driven actuating means, and other means operated by said mold for stopping the conveyor actuating means and again bringing said driven actuating means into operation to remove the mold from said transfer conveyor and actuate the same over said other track means.

7. In apparatus of the class described, a pair of track means spaced a substantial distance apart, a plurality of molds adapted to travel over said track means, transfer conveyors adjacent the ends of said track means and adapted to shift said molds from one track to another, means associated with one of said track means for successively filling said molds with plastic material, means associated with the other track means for stripping said molds and removing the formed objects therefrom, means associated with said track means for actuating said molds over said track means in opposite directions on each track, and means for operating said transfer conveyors, said actuating means and said conveyor operating means being so arranged that only one is operative at a time, and said stripping means being arranged to become operative to strip a mold only when said transfer conveyors are operative to transfer other molds from one track to another.

8. In apparatus of the class described, a pair of stationary track sections providing runways over which a plurality of molds are adapted to travel, transfer conveyors adjacent the ends of said track sections to transfer said molds from one section to the other, means associated with one of said sections for loading said molds with plastic material, means associated with the remaining track section for stripping said molds and removing the formed molded object therefrom, means associated with said track sections for actuating said molds over said sections in in opposite directions, means for operating said transfer conveyors, and means for operating said stripping means, said actuating and operating means being synchronized to become continuously successively operative upon the completion of the preceding operation or operations.

9. In apparatus of the class described, a mold, means for stripping said mold positioned above said mold, said means comprising link means for engaging a side of said mold and inverting said mold to remove the molded object therefrom, and means for actuating said link means to engage said mold side and invert the same, said actuating means being automatically reversible to return said link means and said mold to initial position.

10. In apparatus of the class described, a mold, comprising means for simultaneously forming a plurality of slabs, means adapting the mold to be shifted from place to place, means hingedly connected with said mold adapted for engagement by means to remove said slab from said mold, and means connected with said hingedly connected means for separating the same to release the formed slabs therefrom.

11. In apparatus of the class described, a multi-slab mold, comprising a base, sides on said base defining the sides of the slabs to be molded, one of said sides being movable with respect to the opposite side, a slidable partition between said sides, said partition and said movable side being connected so that when said side is moved a certain distance said partition will also be moved, and means connected with said movable side to provide engagement with means for moving said side and thereby said partition to release the slabs.

12. A mold comprising means for forming a plurality of individual molded units, material retaining means, dividers for separating the material being molded, and means for progressively spreading said retaining means and dividers when said molded units are to be released from said mold.

13. A mold comprising means for forming a plurality of individual molded units, fixed and movable material retaining means, dividers for separating the material being molded, and means for progressively spreading said movable retaining means and said dividers when said molded units are to be released from said mold.

14. A mold comprising means for forming a plurality of individual molded units, fixed and movable material retaining means, dividers for separating the material being molded, and slotted links connecting said dividers and movable retaining means and adapted to progressively spread said movable retaining means and said dividers each relative to the other when said molded units are to be released from said mold.

15. A mold comprising means for forming a plurality of individual molded units, fixed and movable material retaining means, dividers for separating the material being molded, said retaining means and dividers being provided with complemental projections and depressions to impart defined contours in said molded units, and means for progressively spreading said movable retaining means and said dividers sufficiently apart to clear the molded units from said projections and depressions when said molded units are to be removed from said mold.

16. In a mold for plastic materials, a base member and material retaining walls, two of said walls being movable one to the other to effect removal of the molded object, and the other of said walls being provided with resilient means to permit relative movement of said other walls upon expansion of the plastic material in setting.

WILLIAM M. McNEIL.